United States Patent
Sato

[19]

[11] Patent Number: 6,064,030
[45] Date of Patent: May 16, 2000

[54] MANUFACTURING METHOD OF ROTARY SHAFT WITH HARD FACED JOURNAL

[75] Inventor: Akihiro Sato, Tokai, Japan

[73] Assignee: Hoshizaki Denki Kabushiki Kaisha, Toyoake, Japan

[21] Appl. No.: 08/948,477

[22] Filed: Oct. 10, 1997

Related U.S. Application Data

[63] Continuation-in-part of application No. 08/441,884, May 16, 1995, abandoned.

[30] Foreign Application Priority Data

May 16, 1994 [JP] Japan ................................ 6-101133
May 9, 1995 [JP] Japan ................................ 7-110412

[51] Int. Cl.[7] .................................................. B23K 26/34
[52] U.S. Cl. ................................. 219/121.64; 219/76.1; 228/112.1
[58] Field of Search ............................ 219/76.1, 76.13, 219/76.14, 76.15, 121.66, 121.64, 121.85; 228/112.1, 113, 114, 114.5; 29/895, 895.2, 895.22, 895.33; 148/512, 518, 519, 525

[56] References Cited

U.S. PATENT DOCUMENTS

| | | |
|---|---|---|
| 2,803,559 | 8/1957 | Rutherfurd et al. ................... 219/76.1 |
| 4,243,867 | 1/1981 | Earle et al. ......................... 219/121.63 |
| 4,395,109 | 7/1983 | Nakajima et al. .................... 219/59.1 |
| 4,484,455 | 11/1984 | Hida .......................................... 62/320 |
| 4,538,052 | 8/1985 | Asanuma et al. ....................... 219/469 |
| 4,938,045 | 7/1990 | Rosenstock et al. ....................... 492/1 |
| 4,942,059 | 7/1990 | Wilson .................................. 219/76.1 |
| 5,209,283 | 5/1993 | Miltzow et al. ............................ 492/7 |
| 5,405,660 | 4/1995 | Psiuk et al. ....................... 219/121.66 |

FOREIGN PATENT DOCUMENTS

| | | | |
|---|---|---|---|
| 55-61389 | 5/1980 | Japan . | |
| 56-19976 | 2/1981 | Japan . | |
| 4-322816 | 11/1992 | Japan .................. | 29/895.2 |
| 8-35751 | 2/1996 | Japan . | |

*Primary Examiner*—Gregory Mills
*Attorney, Agent, or Firm*—Arent Fox Kintner Plotkin & Kahn, PLLC

[57] ABSTRACT

A manufacturing method of a rotary shaft having a body portion and a pair of coaxial journals integral with opposite ends of the body portion, wherein a hollow journal base metal is prepared separately from the body portion of the rotary shaft for providing at least one of the coaxial journals of the rotary shaft, a layer of antiabrasive and anticorrosive alloy is formed on a cylindrical surface of the hollow journal base metal by build up welding or hard facing, and the hollow journal base metal is connected at one end thereof with the corresponding one end of the body portion of the rotary shaft by friction welding.

3 Claims, 1 Drawing Sheet

MANUFACTURING METHOD OF ROTARY SHAFT WITH HARD FACED JOURNAL

This application is a continuation-in-part of application Ser. No. 08/441,884 filed May 16, 1995.

BACKGROUND OF THE INVENTION

1. Field of the Invention

The present invention relates to a method of manufacturing a rotary shaft integral with a hard faced journal, more particularly to a method of manufacturing a rotary shaft such as an auger shaft adapted for use in an auger type icemaker.

2. Description of the Prior Art

In manufacture of a rotary shaft such as an auger shaft in an auger type icemaker, a layer of antiabrasive and anticorrosive alloy is formed on a cylindrical surface of a journal base metal of the rotary shaft by build-up spraying to enhance resistance of the journal against abrasion and corrosion. The alloy layer formed by built up spraying is, however, apt to be separated from the base metal of the journal due to its thinness and shallow penetration into the base metal, particularly if the fuse process after build up spraying is insufficient. To overcome this problem, it has been proposed to form a layer of antiabrasive and anticorrosive alloy on a cylindrical surface of the base metal of the journal by build up welding or hard facing. Although in the process of build up welding or hard facing, the alloy layer is formed thick on the base metal and deeply penetrates into the base metal, there will occur cracks in the alloy layer if preheat of a portion of the base metal to be welded is insufficient.

For the purpose of avoiding such a problem as described above, it has been proposed to prepare a pair of journal base metals separately from a body portion of the rotary shaft thereby to form a layer of the alloy on each cylindrical surface of the journal base metals by build-up welding or hard facing. In this case, the journal base metals are coaxially connected at their one ends to opposite ends of the body portion of the rotary shaft by friction welding. In such a manufacturing process as described above, however, there will occur cracks in the welded or hard faced alloy layer unless the journal base metals are sufficiently preheated before the process of build-up welding or hard facing.

SUMMARY OF THE INVENTION

It is, therefore, a primary object of the present invention to provide an improved method of manufacturing a rotary shaft integral with a hard faced journal without causing the problems discussed above.

According to the present invention, the object is accomplished by providing a manufacturing method of a rotary shaft having a body portion and a pair of coaxial journals integral with opposite ends of the body portion, which comprises the steps of preparing a hollow journal base metal separately from the body portion of the rotary shaft for providing at least one of the coaxial journals of the rotary shaft, forming a layer of antiabrasive and anticorrosive alloy on a cylindrical surface of the hollow journal base metal by build-up welding or hard facing, and connecting one end of the hollow journal base metal to the corresponding one end of the body portion of the rotary shaft by friction welding.

BRIEF DESCRIPTION OF THE DRAWING

Other objects, features and advantages of the present invention will be more readily appreciated from the following detailed description of preferred embodiments thereof when taken together with the accompanying drawing, in which.

DESCRIPTION OF THE PREFERRED EMBODIMENT

Figure 1:
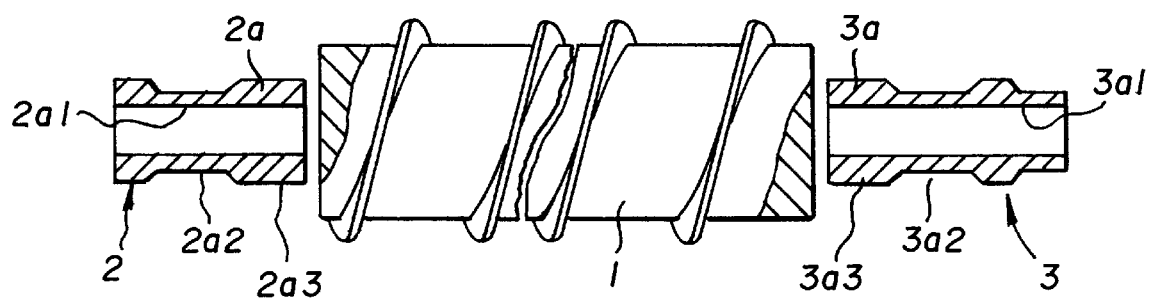
FIG. 1 illustrates a manufacturing process of an auger shaft in accordance with the present invention.
Figure 2:
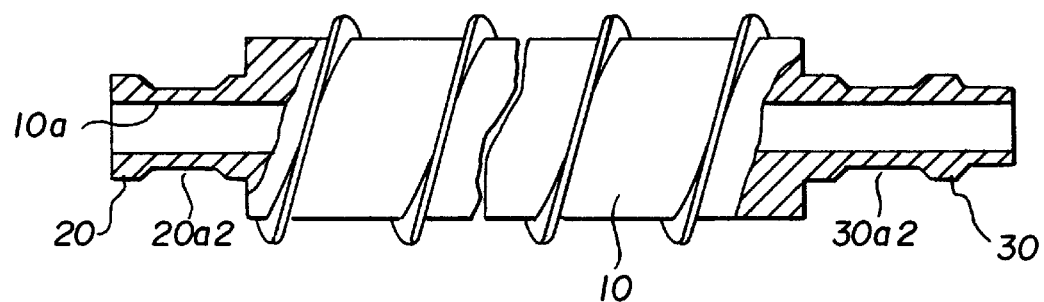
FIG. 2 illustrates another manufacturing process of an auger shaft in accordance with the present invention.

Referring now to the drawings, FIG. 1 illustrates a rotary shaft in the form of an auger shaft to be mounted for rotary movement within an upright evaporator housing (not shown) of an auger type icemaker. The auger shaft has a solid body portion 1 formed with a helical blade and a pair of coaxial journals 2 and 3 which are supported by upper and lower bearings (not shown) assembled within the upright evaporator housing. In a manufacturing process of the auger shaft in accordance with the present invention, a pair of journal base metals 2a, 3a were prepared separately from the body portion 1 of the auger shaft, respectively. Since the journal 3 of the auger shaft is substantially the same as the journal 2, the detailed description of the journal 2 only is believed necessary.

The journal base metal 2a was formed with an axial through bore 2a1 coaxially therewith and formed thereon with an annular groove 2a2 of 0.8 mm in depth. To enhance resistance of the journal 2 against abrasion and corrosion, a layer of hard facing alloy was formed in the annular groove 2a2 of journal base metal 2a by $CO_2$ laser welding without preheating the base metal, in a normal atmosphere. The raw material of the hard facing layer was prepared in the form of powder the composition of which includes Cr 29.0%, Mo 4.0%, Co 3.0%, Fe 3.0%, Mn 1.0%, W 2.0%, B 0.6%, Si 1.0%, C 1.1% and the rest Ni. In this case, the $CO_2$ laser welding was carried out under conditions described below.

"Laser power: 4.5 kW(CW(multimode)), wave length: 10.6 $\mu$m, defocus distance: +40 mm, diameter of irradiation beam: 6.2 mm (acryl burn pattern), and feed pitch: 5 mm."

As a test, a journal base metal of 40 mm in diameter was machined to form a cylindrical through bore coaxial therewith. Thereafter, a layer of the hard facing alloy was welded in the annular groove 2a2 of the journal base metal under the conditions described above. In careful inspection after the process of welding, any crack was not found on the surface of the welded alloy layer. With the foregoing process, the journals 2, 3 were completed and connected at their one ends to opposite ends of the solid body portion 1 by friction welding to complete the auger shaft. In addition, respective end portions 2a3, 3a3 of the journals 2, 3 were formed as a grip portion for connection to the opposite ends of the body portion 1 in the process of friction welding.

To compare with the hollow journal base metal described above, a solid journal base metal was prepared in the same diameter as the hollow journal base metal and formed there-on with an annular groove in the same manner as in the hollow journal base metal. Thus, a layer of the same alloy was welded in the annular groove of the solid journal base metal under the same condition described above. In the case that the solid journal base metal had not been pre-heated before the process of welding, undesired cracks were found in the surface of the welded alloy layer. To avoid the occurrence of such cracks, it was required to sufficiently preheat the solid journal base metal prior to the process of welding, and it was also required to feed the alloy powder at a low speed during the process of build up welding.

In the process of build up welding or hard facing, a relationship between the heat capacity of the journal base metal to be welded and that of a deposit metal welded on the journal base metal should be carefully considered. For example, the heat capacity of a solid journal base metal for an auger shaft is greatly larger than that of a deposite metal even in a condition where the journal base metal is prepared separately from the body portion of the auger shaft. Therefore, a large portion of heat generated by build up welding or hard facing is absorbed into the journal base metal from the deposit metal, while the welded layer of the deposit metal is rapidly cooled more than the journal base metal. This causes a great difference in temperature between the welded layer of the deposit metal and the journal base metal. As a result, the welded layer of the deposit metal is rapidly contracted more than the journal base metal, resulting in the occurrence of cracks in the welded layer of the deposit metal. For this reason, it is required to preheat the solid journal base metal before the process of welding thereby to decrease the difference in temperature between the welded layer of the deposit metal and the journal base metal during the cooling process.

In contrast with the build up welding or hard facing of the solid journal base metal, the hollow journal base metal used in the present invention is useful to decrease the difference in heat capacity between the deposit metal and the journal base metal and to decrease the amount of welding heat absorbed into the journal base metal. Thus, the difference in temperature between the welded layer of the deposit metal and the journal base metal after the process of welding is reduced. As a result, even if the deposit metal was welded on the base metal in a normal atmosphere, without preheat of the journal base metal, any crack would not occur in the welded layer of the deposit metal.

As is understood from the above description, in the manufacturing process of an auger shaft according to the present invention, preheat of the journal base metal before the process of welding is not required to prevent the occurrence of cracks in the welded layer of the deposit metal. Accordingly, an equipment for preheat of the journal base metal becomes unneccessary, and the time for welding of the deposit metal can be shortened. Since the journal base metal is hollowed, the friction welding of the journal base metal can be carried out by a relatively small thrust force.

Although in the manufacturing process of the auger shaft described above, the $CO_2$ laser welding was adapted to decrease dilution of the welded alloy layer caused by the journal base metal, a plasma welding process may be adapted in stead of the $CO_2$ laser welding under conditions described below.

"Current: 70 to 55 A, feed amount of alloy powder: 10 g/min, rotation speed: 3.5 r.p.m., total number of rotation: 8, feed pitch: 3 mm per one rotation, and arc time: 2.6 min".

The equipment of the plasma welding process can be installed in a small space at a low cost in comparison with the equipment of the $CO_2$ laser welding process.

Although in the above embodiments the manufacuring method of the present invention was adapted to an auger shaft for use in an auger type icemaker, it is to be noted that the manufacuring method of the present invention can be adapted to various other rotary shafts the journals of which are required to be applied with build up welding for resistive against abrasion and corrosion.

What is claimed is:

1. A method of manufacturing a rotary shaft having a solid body portion and a pair of coaxial journals integral with opposite end surfaces of the solid body portion, comprising the steps of:

preparing a hollow journal base metal separately from the solid body portion of said rotary shaft for providing at least one of the coaxial journals of said rotary shaft;

forming a layer of anti-abrasive and anti-corrosive alloy in a cylindrical surface of said hollow journal base metal by build-up welding or hard facing while said hollow journal base matal is separated from the solid body portion of said rotary shaft, without preheaing said base metal; and thereafter connecting one end of said hollow journal base metal to the corresponding one end surface of the solid body portion of said rotary shaft by friction welding.

2. The manufacturing method of a rotary shaft as claimed in claim 1, wherein the anti-abrasive and anti-corrosive alloy is prepared from a powder comprising by weight Cr 29.0%, Mo 4.0%, Co 3.0%, Fe 3.0%, Mn 1.0%, W 2.0%, B 0.6%, Si 1.0%, C 1.1% and Ni 55.3%.

3. The manufacturing method of a rotary shaft as claimed in claim 1, wherein the layer of anti-abrasive and anti-corrosive alloy is formed by $CO_2$ laser build-up welding.

* * * * *